J. ROSS.
Water Closet.
No. 231,684.  Patented Aug. 31, 1880.
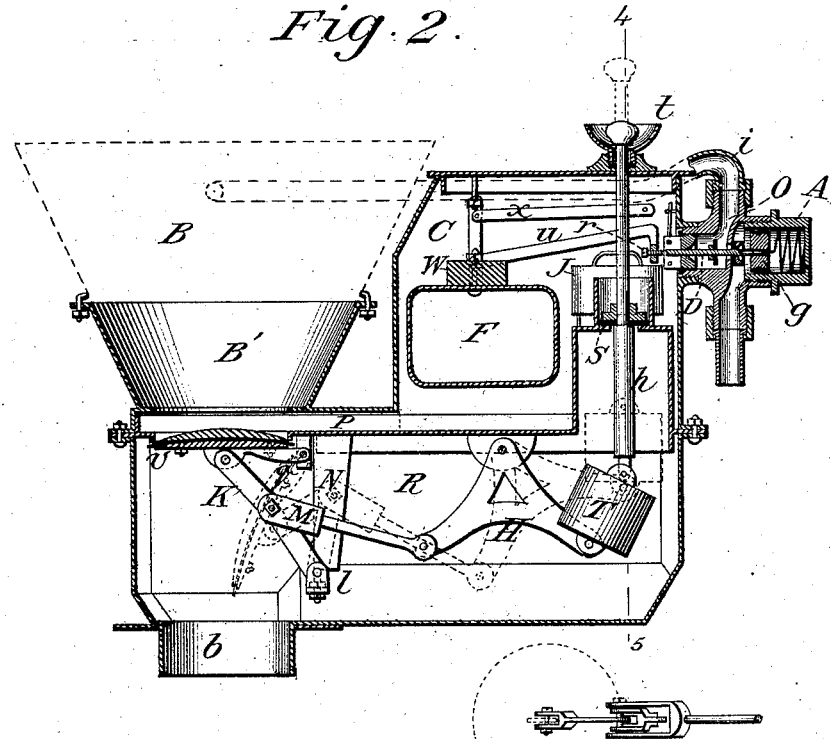
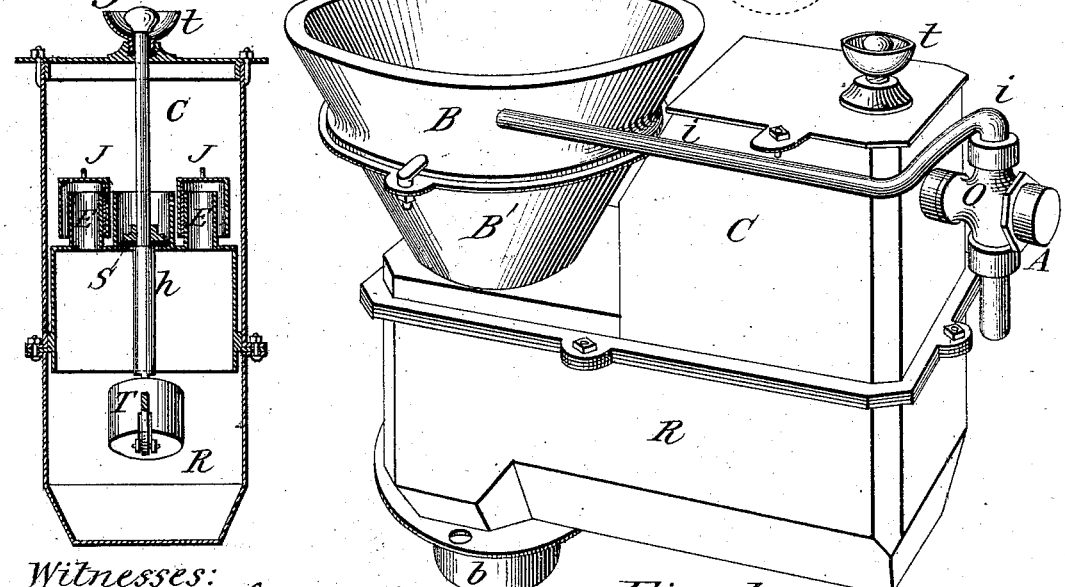
Witnesses:
Archibald Edward McKechnie
Alexander Ross
Inventor.
John Ross

UNITED STATES PATENT OFFICE.

JOHN ROSS, OF BOSTON, MASSACHUSETTS.

WATER-CLOSET.

SPECIFICATION forming part of Letters Patent No. 231,684, dated August 31, 1880.

Application filed March 29, 1880. (Model.)

*To all whom it may concern:*

Be it known that I, JOHN ROSS, of Boston, in the county of Suffolk and State of Massachusetts, have invented a new and Improved Water-Closet, which improved water-closet is fully set forth in the following specification, reference being had to the accompanying drawings.

The object of this invention is to prevent the escape of sewer-gas and the very disagreeable odor that is cast up by the movement of the pan in the present pan water-closet every time the handle is raised; also to have the least possible surface exposed when the water is let out of the bowl.

Figure 1 is a perspective view of the water-closet. Fig. 2 is a vertical longitudinal section on the dotted line 1 2 3, Fig. 1, giving a detailed view of the water-closet. Fig. 3 is a vertical transverse section on the dotted line 4 5, Fig. 2, and is to show the two overflow-pipes E E with caps J J.

Similar letters refer to similar parts throughout the several views.

The valve $v$ is formed of rubber, held in convex form by brass plates, and pressed into concave brass ring by straight crank K, which is hinged onto it, as also at lower end it is hinged onto cross-head $l$, supported by two triangular posts, N. It is also hinged in center to rod M, connecting it with crank H, so as when the pull $h$ is raised the straight crank K is doubled at center hinge, drawing valve $v$, which turns on its own hinge at $q$, downward against posts N. The water-closet trap being immediately below, (the outlet-pipe $b$ entering it,) the least possible surface is exposed when the water is let out of bowl B.

When the pull $h$ is let fall the weight T closes valve $v$ by pressing crank K into straight line and leaving it as a shore or buttress against under side of valve $v$, as shown in Fig. 2. There are four nuts on lower ends of posts N, that hold cross-head $l$. They are for adjusting it to length of crank K. Therefore the water-closet valve $v$ cannot be pressed down, and so made to leak water, as it is not supported against its seat in the usual way by a shaft or axle on one side of the valve, as the pan in common pan water-closets is supported where the shaft or axle, by the least pressure from above, is twisted.

When the pull $h$ is raised the water flows from cistern C, where float F operates, through passage P over the valve $v$, thus insuring its being kept clean and washing away any paper that might possibly cling to the sides around it after the bowl is emptied. The quantity of water let down the soil-pipe every time the handle is raised is perfectly sufficient for all flushing purposes without being excessive. I have found that when a very large amount of water is suddenly let down a soil-pipe it is liable to siphon other traps connected with the same soil-pipe.

The trap of this water-closet is as easy of access as the trap of the common pan water-closet to be cleared or emptied, if required.

The caps J J, Fig. 3, turn the two overflow-pipes E E into traps. The caps can be removed at pleasure. These overflows are only required when water is poured into the water-closet or some disarrangement takes place.

The pull $h$ passes up through stand-pipe between the two overflow-pipes, and has leather seat S, held by nut screwed down on it, so that when the pull $h$ is let down the leather seat S rests on seat at bottom of stand-pipe, through which the pull passes. This, with the two overflow-traps, makes a perfect seal against any escape of foul odor from lower chamber, R, of water-closet. The leather seat S also forms a rest to support weight T. The pull $h$ passes through packing-box below cup $t$, which cup forms the screw that keeps packing in place.

When the water-closet valve $v$ is opened by raising pull $h$, letting the water out of bowl B, the cistern C is also emptied through passage P. The float F falls, being weighted with weight W, sufficient to press back spindle D of valve or cock O, when the water flows freely through pipe $i$ into bowl B, until the pull $h$ is let down, closing valve $v$, when the water flows through passage P into cistern C, causing the float F to rise, thus relieving spindle D of cock or valve O from weight of float F. The water then presses back spindle D to its seat, shutting off the water. The spindle is also assisted in shutting by spiral spring in chamber A. The height of water in bowl B and cistern C can be regulated by small screw $r$ in lever $u$ of float F, which presses against end of spindle D of cock or valve O. This screw $r$ serves the same purpose that is attained when it is desired to regulate a ball-cock by bending ball-lever.

The two rods X act as a parallel motion to float F, and hold it from coming into contact with the sides of cistern C.

It will be seen that the water-closet cannot be left without water in the bowl B, for the water-supply acts independently. If the water were to be taken out of water-closet without raising pull h the float F would fall, opening valve or cock O, thus keeping the bowl full; or if the water were let out by raising pull h when, for any reason, the water was not on, float F would remain down, keeping open cock or valve O until the water was let on, when it would float, allowing cock or valve O to close, which is not the case with pan water-closets of any kind.

B', Fig. 1, is a receiver to receive common porcelain water-closet bowl. The screws on under side of cover of cistern C are to hold weight W, when not in use, on float F.

I am aware that water-closets with valves instead of pans have been made in various forms to hold water and receive the soil. I therefore do not claim, specially, the valve v; but What I do claim as my invention, and desire to secure by Letters Patent, is—

1. In combination with a water-closet having valve v, the jointed crank-rod K, hinged to the center of said valve, adjustable at its lower end on cross-head l, and hinged near the center of its length to rod M, substantially as and for the purpose set forth.

2. The combination of float F, lever u, screw r, and supply-valve spindle, substantially as specified.

3. The pull-handle h, provided with packing S, in combination with the valve v and intermediate mechanism, substantially as described, as and for the purpose set forth.

JOHN ROSS.

Witnesses:
ALEXANDER ROSS,
JOHN HATTIN.